Figure 1:
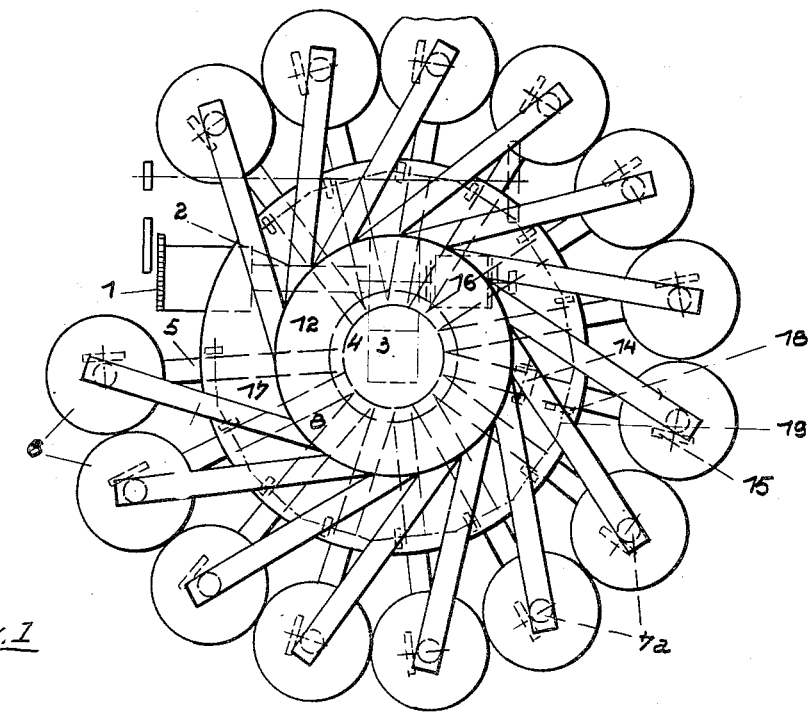

Oct. 6, 1931.      R. G. NEUMANN      1,826,086

WIND SEPARATOR FOR COCOA POWDER

Filed Aug. 1, 1930

Patented Oct. 6, 1931

1,826,086

UNITED STATES PATENT OFFICE

RICHARD G. NEUMANN, OF WANDSBEK, NEAR HAMBURG, GERMANY

WIND SEPARATOR FOR COCOA POWDER

Application filed August 1, 1930, Serial No. 472,332, and in Germany November 6, 1929.

This invention relates to a wind separator for cocoa powder and other pulverous materials which consists substantially of circular separators arranged raised around an air filter, a uniform sifting of the material being obtained by said circular arrangement, without any interruptions of flow being produced.

Wind separators are already known, which have a common distributing chamber, channels passing therefrom to the individual separators. The separators are however all connected one behind the other and side by side so that unequal sifted material is delivered through the long stretched distributing pipes, as the wind produced by the exhauster becomes weaker the further it is distant therefrom. Consequently the first separators deliver a coarser sifted material. In order to prevent these differences in the sifted material from being too great, only a limited number of separators could be used and care had to be taken that the total output does not exceed a certain quantity. A large number of different sorts of sifted material were produced, which could never again be brought to uniform condition. In the case of horizontal wind separators a great objection is, that the deposits of the powders to be sifted in the horizontal pipes and elevator corners or the like led to eddy- or shrifting-troubles, so that in the case of foodstuffs even fungus formation and fermentations occur.

The above mentioned objections are entirely obviated according to the invention, and only one kind of finished sifted material is delivered, in that the separators are arranged raised in a circle around an air filter and connected with the air filter by pipes.

Moreover the separators are each connected with the exhauster by means of a pipe, so that the lighter sifted material passes directly into the air filter and the coarser is returned into the exhauster through air excluders arranged in star shape, in order that through the riser blower pipe the sifting in each separator takes place again under the same conditions. Moreover the pipes connecting the air filter to the separators extend tangentially into the filter, so that by this construction all interruptions of flow of the opposite mouths are prevented. Owing to the raised arrangement of the separators and of the air filter relative to the exhauster all conveying means and all detrimental spaces are avoided.

For removing the coarser powder throttle valves are provided in the drop pipes, which valves are controlled in such a manner that on the one hand the material passes into the suction pipe of the exhauster and on the other hand into a tub for carrying away in order to be conveyed directly to a rolling mill for further crushing.

An embodiment of the invention is illustrated by way of example in the accompanying drawings in which:—

Figure 2:
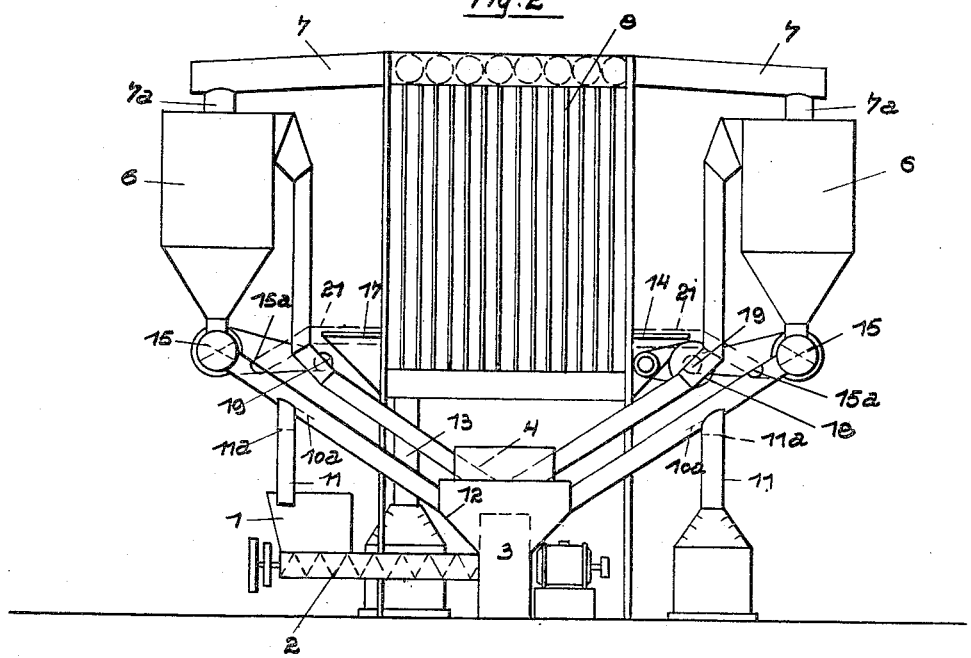

Fig. 1 is a top plan view and
Fig. 2 a side elevation.

A feed hopper 1 is connected with a feed worm 2 and serves for accommodating the material to be sifted. The feed worm 2 conveys the material into an exhauster 3, which is driven by a motor 16. Riser blow pipes 5 are connected to the exhauster by means of a funnel 4, and the pipes arranged in a circle convey the material upwards into the separators 6 in the form of radial jets.

The drawing shows a form of construction with fourteen riser blow pipes 5 of exactly the same length, each pipe terminating in a separator.

Owing to the air current laden with material to be sifted being guided in a circle, a centrifugal force is produced in the particles of the material in the separator, so that the fine cocoa powder is automatically separated from the coarse, as the coarse powder is thrown against the wall of the individual separator, and the fine powder rises in the central pipe 7a, through which it is blown tangentially into the air filter 8.

The air hoses from which the air can escape are connected to the air filter in known manner and the cocoa powder is sucked off through pipe 13. The coarser material, which has dropped inside on the wall of the separators, passes through a cell wheel air excluder 15 into the drop pipe 10, whence it finally returns into the suction pipe 12 of the exhauster 3. The circulation of this coarse material continues as described until no more fine powder is contained in the coarse material.

As soon as this stage has been reached a throttle valve 10a in the drop pipe 10 is closed and a further valve 11a in the drop pipe 11 is opened so that the coarse residues can run off into a tub or the like in which it is conveyed to a rolling mill for further grinding, or it may pass directly into this mill.

The cell-wheel air excluders 15 are driven from a motor 14 independently from the motor 16 in which a suitable transmission is inserted. The motor 14 is preferably arranged under the bridge 17 and drives corner ball joint transmissions 18, 19. The shaft 19 is connected with all cell wheel air excluders which close the separators at the bottom. The drop pipes 10 are provided with sockets 15a for the admission of fresh air. The opening is arranged close behind the cell wheel air excluder. Connecting pipes 21 lead from the sockets 15a to the air filter 8, in order to again catch the cocoa aromatic air coming from the air hoses 9. All cloth hoses 9 of this filter are for this purpose air tightly encased all round, for example with sheet metal, so that a larger cylinder is produced, and the same air, saturated with aroma filtering through the cloth hoses, is repeatedly used for sifting, as the drop pipes 10 communicate with this cylinder and its inner cloth hose pipes 9 through connecting pipes 21, as also with the suction pipe of the exhauster through the funnel 12.

It is necessary in the case of foodstuffs to utilize as far as possible the same air in order to prevent the actual powder, for example cocoa powder, from being lixiviated and becoming tasteless. It is also precisely for this reason that the air filter is arranged in the centre of the circle of separators, because all the pipe passages can therefore be shorter and all the pipes can be made the same length. For the purpose of cooling the sifting air, which in summer becomes hot through friction, it is advisable to insert a known air cooler between the pipe conduits. A circulating water cooling may also be arranged when a double walled filter jacket is used.

Consequently according to the invention an absolutely uniform sifted material is obtained through the arrangement of the separators 6 in a circle around the air filter 8, no conveying means being required.

I claim:—

1. A wind separator for cocoa powder and other pulverous materials, comprising in combination an air filter, separators arranged raised in a circle around said filter, riser pipes connecting said separators to said filter, a cell-wheel air excluder in the bottom end of each separator, an exhauster, a suction pipe for said exhauster, drop pipes one for each of said air excluders connecting same with said suction pipe, and a throttle valve arranged in each of said drop pipes.

2. A wind separator as specified in claim 1, in which the riser pipes connecting the separators to the air filter extend tangentially into the filter.

3. A wind separator as specified in claim 1, comprising in combination with each drop pipe, a throttle valve in each drop pipe, a second set of drop pipes for removing the coarse material connected one each with one of said drop pipes with throttle valve, and a valve in each of said second drop pipes adapted to allow the passing of said coarse oversize material.

4. A wind sifter as specified in claim 1, comprising an air filter composed of an air tight vessel and cloth hoses arranged in said vessel, drop pipes each with a throttle valve ending in said vessel, and branch pipes connecting the lower end of said vessel to said drop pipes with throttle valves.

In testimony whereof I affix my signature.

RICHARD G. NEUMANN.